(12) United States Patent
Watson (10) Patent No.: US 8,661,898 B2
(45) Date of Patent: Mar. 4, 2014

(54) VIBRATING STRUCTURAL GYROSCOPE WITH QUADRATURE CONTROL

(75) Inventor: William S. Watson, Eau Claire, WI (US)

(73) Assignee: Watson Industries, Inc., Eau Claire, WI (US)

( * ) Notice: Subject to any disclaimer, the term of this patent is extended or adjusted under 35 U.S.C. 154(b) by 898 days.

(21) Appl. No.: 12/579,098

(22) Filed: Oct. 14, 2009

(65) Prior Publication Data
US 2010/0089158 A1    Apr. 15, 2010

Related U.S. Application Data

(60) Provisional application No. 61/105,236, filed on Oct. 14, 2008.

(51) Int. Cl.
*G01C 19/00* (2006.01)

(52) U.S. Cl.
USPC ............... 73/504.12; 73/504.08; 73/504.18

(58) Field of Classification Search
USPC ......... 73/504.12, 503.3, 504.08, 504.18, 540, 73/1.37
See application file for complete search history.

(56) References Cited

U.S. PATENT DOCUMENTS

| | | | |
|---|---|---|---|
| 4,898,032 A * | 2/1990 | Voles | 73/504.16 |
| 4,951,508 A | 8/1990 | Loper, Jr. et al. | |
| 5,289,258 A * | 2/1994 | Szafraniec et al. | 356/460 |
| 5,383,362 A | 1/1995 | Putty et al. | |
| 5,400,269 A * | 3/1995 | White et al. | 702/190 |
| 5,419,194 A | 5/1995 | Varnham et al. | |
| 5,428,995 A | 7/1995 | Fersht et al. | |
| 5,629,472 A | 5/1997 | Varnham et al. | |
| 5,796,002 A * | 8/1998 | Layton | 73/504.16 |
| 5,850,035 A * | 12/1998 | Layton et al. | 73/504.16 |

(Continued)

FOREIGN PATENT DOCUMENTS

| | | |
|---|---|---|
| CA | 02227155 | 1/1998 |
| EP | 0 141 621 | 5/1985 |

(Continued)

OTHER PUBLICATIONS

Eik Arnold et al.: "Compensation methods for a silicon tuning fork gyroscope", Microsystem Technologies; Micro and Nanosystems Information Storage and Processing Systems, Springer, Berlin, DE, vol. 14, No. 4-5, Oct. 27, 2007, pp. 623-628.

(Continued)

*Primary Examiner* — Peter Macchiarolo
*Assistant Examiner* — Samir M Shah
(74) *Attorney, Agent, or Firm* — Skaar Ulbrich Macari, P.A.

(57) ABSTRACT

An apparatus and/or method that corrects for tuning errors in vibrating structure gyroscopes that are configured to be driven along a plurality of axes without the need for dedicated torque elements. The correction is accomplished by introducing a phase offset in the drive signal of one or more of the drive elements relative to other drive elements to minimize or reduce the quadrature signal. The tuning may be accomplished as a one time "set and forget" adjustment, as a manual adjustment performed at the discretion of the user, or as a closed loop active correction system. The technique improves the tuning of the resonator assembly, rather than merely compensating for the mistuning. Accordingly, for various embodiments of the invention, the destructive interference between the plurality of drive axes is reduced. Conservation of vibrational energy present in the resonator is thus enhanced, with less vibrational energy transferred to the support structure.

25 Claims, 8 Drawing Sheets

(56) References Cited

U.S. PATENT DOCUMENTS

| | | | |
|---|---|---|---|
| 5,996,410 A | | 12/1999 | Yachi et al. |
| 6,003,373 A * | | 12/1999 | Moore et al. ............... 73/504.16 |
| 6,296,779 B1 * | | 10/2001 | Clark et al. ..................... 216/66 |
| 6,370,937 B2 | | 4/2002 | Hsu |
| 6,481,285 B1 | | 11/2002 | Shkel et al. |
| 6,675,630 B2 | | 1/2004 | Challoner et al. |
| 6,805,007 B2 | | 10/2004 | Fell et al. |
| 6,883,361 B2 | | 4/2005 | Wyse |
| 6,901,799 B2 | | 6/2005 | Chen et al. |
| 6,906,510 B2 * | | 6/2005 | Wolf et al. ..................... 324/174 |
| 6,915,215 B2 | | 7/2005 | M'Closkey et al. |
| 6,934,660 B2 | | 8/2005 | Painter et al. |
| 6,934,665 B2 | | 8/2005 | Rober |
| 7,051,590 B1 * | | 5/2006 | Lemkin et al. ............. 73/504.04 |
| 7,159,441 B2 | | 1/2007 | Challoner et al. |
| 7,188,522 B2 | | 3/2007 | Betz et al. |
| 7,216,525 B2 | | 5/2007 | Schroeder |
| 7,231,823 B2 | | 6/2007 | Schroeder |
| 7,240,533 B2 * | | 7/2007 | Fell et al. ....................... 73/1.38 |
| 7,249,488 B2 | | 7/2007 | Schroeder |
| 7,290,435 B2 | | 11/2007 | Seeger et al. |
| 7,318,347 B2 | | 1/2008 | Lynch et al. |
| 7,337,665 B2 | | 3/2008 | Schroeder |
| 7,481,109 B2 | | 1/2009 | Moore et al. |
| 7,481,110 B2 | | 1/2009 | Handrich et al. |
| 7,526,957 B2 * | | 5/2009 | Watson ....................... 73/504.13 |
| 7,549,334 B2 | | 6/2009 | Cardarelli et al. |
| 7,565,839 B2 | | 7/2009 | Stewart et al. |
| 7,617,727 B2 * | | 11/2009 | Watson ....................... 73/504.13 |
| 8,096,179 B2 * | | 1/2012 | Bien et al. .................. 73/504.02 |
| 8,151,641 B2 * | | 4/2012 | Geen ........................... 73/504.12 |
| 2002/0149358 A1 * | | 10/2002 | Doescher ................. 324/207.21 |
| 2003/0033850 A1 | | 2/2003 | Challoner et al. |
| 2003/0056588 A1 * | | 3/2003 | Fell et al. ...................... 73/503.3 |
| 2003/0196475 A1 * | | 10/2003 | Wyse ............................. 73/1.37 |
| 2004/0108850 A1 * | | 6/2004 | Wolf et al. ................. 324/207.2 |
| 2004/0255640 A1 | | 12/2004 | Wyse |
| 2005/0256659 A1 | | 11/2005 | Malvern et al. |
| 2007/0089510 A1 | | 4/2007 | Wyse et al. |
| 2007/0240508 A1 * | | 10/2007 | Watson ....................... 73/504.12 |
| 2007/0256495 A1 * | | 11/2007 | Watson ....................... 73/504.12 |

FOREIGN PATENT DOCUMENTS

| | | |
|---|---|---|
| EP | 1 752 735 | 2/2007 |
| JP | 2001-021362 | 1/2001 |
| WO | WO 03/025500 A2 | 3/2003 |

OTHER PUBLICATIONS

Arnold E. et al.: "A tuning fork gyroscope with compensated imbalance signal", Proceedings of the SPIE—The International Society for Optical Engineering SPIE—The International Society for Optical Engineering USA, vol. 6589, 2007, pp. 658901-658906.

Extended European Search Report for Application No. EP 09173036. 6-1557/2177875 date Mar. 21, 2013.

Asokanthan et al., "Nonlinear Instabilities in a Single-axis Vibratory Gyroscope," Structures, Structural Dynamics, and Materials Conference, American Institute of Aeronautics and Astronautics, Inc., (2007) 1 page.

Nasiri, "A Critical Review of MEMS Gyorscopes Technology and Commercialization Status," Invensense, (2000), pp. 1-8.

Sung et al., "Design and performance test of a MEMS vibratory gyroscope with a novel AGC force rebalance control," J. Micromech. Microeng. (2007) 1 page.

Trusov et al., "Gyroscope Architecture with Structurally Forced Anti-Phase Drive-Mode and Linearly Coupled Anti-Phase Sense-Mode," Transducers, (2009), pp. 660-663.

Watson, "Improved Vibratory Gyro Pick-off and Drive Geometry," Watson Industries, Inc., Symposium Gyro Technology (2006) pp. 1-15.

Yang et al., "A Precision Closed-loop Driving Scheme of Silicon Micromachined Vibratory Gyroscope," Journal of Physics: Conference Sreies 34 (2006), pp. 57-64.

Zaman et al., "High Performance Matched-Mode Tuning Fork Gyroscope," MEMS (2006), Istanbul, Turkey, pp. 66-69.

Japanese Office Action for Japanese Patent Application No. 2009-237361 issued Aug. 13, 2013, 5 pages.

English translation of the Japanese Office Action for Japanese Patent Application No. 2009-237361 issued Aug. 13, 2013, 7 pages.

English Translation of Japanese Laid-Open Patent Publication No. JP2001021362 (A) via Google translator (Jan. 2001).

English Abstract of Japanese Laid-Open Patent Publication No. JP2001021362 (A) (Jan. 2001).

\* cited by examiner

VIBRATING STRUCTURAL GYROSCOPE WITH QUADRATURE CONTROL

RELATED APPLICATION

The present application claims the benefit of U.S. Provisional Patent Application No. 61/105,236, filed on Oct. 14, 2008, the disclosure of which is hereby incorporated by reference in its entirety.

FIELD OF THE INVENTION

The present disclosure is directed generally to the field of gyroscopes. More specifically, the present disclosure is directed to a vibrating structural gyroscope having quadrature control.

BACKGROUND OF THE INVENTION

Vibrating structural gyroscopes (VSGs) have found use in a number of applications involving the detection of rotational rate and position, including attitude sensors and gyrocompasses. Rotational rate and/or position is typically determined by exciting a resonator along one or more drive axes to drive the resonator into an oscillation or vibration pattern and detecting a change in the output signal. The output signal may include a "quadrature" signal or component, herein defined as the component of a complex signal that is 90 degrees out of phase in the time domain with the in-phase component. This quadrature signal is generally considered an unwanted signal that can cause output errors.

Determination of quadrature signal from a rotation rate signal is known in the art. The quadrature signal may be obtained by demodulating the rotation rate signal out-of-phase with respect to the drive oscillation. Such determination of the quadrature signal by demodulation is presented in greater detail in a paper by Dr. D. D. Lynch, "Coriolis Vibratory Gyros," presented at Symposium Gyro Technology, Stuttgart, Germany, 1998 (Lynch), and by U.S. Pat. No. 5,629,472 to Varnham et al. (Varnham).

Some VSGs are configured to drive the resonator assembly along a plurality of drive axes, with the drive axes being offset with respect to each other or, alternatively, being substantially coincident (i.e. defining substantially the same axis in three-dimensional space). The resonant frequency of a VSG resonator assembly will typically differ between respective drive axes. For example, a resonator assembly being driven along two in-phase drive axes typically has a different resonant frequency for the first drive axis than for the second drive axis; that is, each drive axis of the resonator assembly is said to have a unique resonant frequency. The resonator assembly may be designed and manufactured so that the resonant frequencies of the respective drive axes are close. Tuning processes may also be practiced to bring the respective resonant frequencies even closer. However, the resonant frequencies may never be perfectly tuned, particularly over a range of temperatures, because temperature can change the characteristics of the materials of the resonator assembly and cause a degradation of the tuning of the resonator assembly. This degradation and the resulting quadrature signal has been reported in the literature Lynch. Therefore, a quadrature signal can appear when both axes of a dual axis system are driven, resulting in an errant indication of rotation rate and/or rotational position.

A variety of options are available to the artisan to counter the effects of quadrature signals. Some methods focus on altering the vibration characteristics of the resonator. For example, Varnham discloses correction of the quadrature component by mechanically adjusting the resonator mass or mass distribution to tune the gyroscope. U.S. Pat. No. 4,951,508 to Loper et al. (Loper) discloses correcting the quadrature component by electrically adjusting the spring stiffness to tune the gyroscope. Other U.S. Patents and Published Patent Applications (e.g. U.S. Pat. Nos. 6,481,285 and 6,934,660 and U.S. Patent Application Publication No. 2007/0089510) also disclose this technique.

Likewise, U.S. Pat. No. 6,883,361 to Wyse (Wyse) discloses a method and apparatus whereby a DC voltage is introduced near a vibrating ring resonator to incite an oscillating force from the vibration, which coincidentally alters the stiffness of the vibrating element, which can be used to cancel quadrature component. Wyse discloses a "set and forget" system, with no dynamic adjustment for automatic or feedback control. Also, U.S. Pat. No. 6,675,630 to Challoner, et al. (Challoner) discloses a method and apparatus whereby a quadrature signal is applied as a DC bias voltage to affect a phase offset in the drive loop. The methods disclosed by Wyse and Challoner require at least one extra electrode in addition to the drive electrodes to accomplish the stiffening.

Other techniques focus on electronically compensating for the quadrature signal. For example, U.S. Pat. No. 7,120,548 to Malvern et al. (Malvern) discloses a technique whereby the quadrature signal is minimized by feeding a quadrature-correcting phased signal to a dedicated "torquing" element, causing a vibration that interacts with the driven oscillation pattern to drive the quadrature signal to a minimum, thereby actively correcting for the mistuning. U.S. Pat. No. 7,240,533 to Fell et al. (Fell I) presents a variation of this technique by including a phase corrector in the torque control loop that drives the quadrature torque energy directly into the sensed quadrature signal to correct for the effects of the quadrature component. Other examples where a quadrature signal is added to the torque signal to correct for quadrature signal include U.S. Pat. Nos. 7,188,522 and 7,216,525.

U.S. Pat. No. 7,231,823 to Schroder (Schroder) discloses a system wherein a "disturbance component" of the read signal is measured and a frequency offset is implemented as needed to match the disturbance. U.S. Pat. Nos. 7,249,488 and 7,337,665 disclose systems similar to Schroder.

Other systems, such as disclosed in "A Second Generation Silicon Ring Gyroscope" by C. Fell, I. Hopkins and K. Townsend (Fell II), utilize phase locked loops which control the oscillator so that there is either no phase difference or a known phase difference between the drive frequency and the oscillator frequency. Such systems are constantly being adjusted to lock in the phase relationship, and are therefore subject to phase jitter in the phase locked loop.

The disclosures of the above-mentioned patents and publications are hereby incorporated by reference herein in their entirety except for explicit definitions contained therein as follows: U.S. Pat. No. 5,629,472 (Varnham), U.S. Pat. No. 4,951,508 (Loper), U.S. Pat. No. 6,883,361 (Wyse), U.S. Pat. No. 6,675,630 (Challoner), U.S. Pat. No. 7,120,548 (Malvern), U.S. Pat. No. 7,240,533 (Fell I), U.S. Pat. No. 7,231,823 (Schroder), and paper by Dr. D. D. Lynch, "Coriolis Vibratory Gyros," presented at Symposium Gyro Technology, Stuttgart, Germany, 1998 (Lynch).

U.S. Pat. No. 7,526,957 and U.S. Patent Application Publication No. 2007/0256495 to Watson (collectively "Watson"), both assigned to the assignee of the instant application and hereby incorporated by reference herein in their entirety except for explicit definitions contained therein, disclose drive axes that are rotationally skewed relative to the antinode axes of the vibration pattern when the VSG is rotationally at rest. The skewed axes enable the drive elements of a multiple drive axis system to affect a torquing function in addition to sustaining the oscillation pattern, thus eliminating the need for separate dedicated torque elements. Elimination of dedicated torque elements simplifies the resonator assembly and can provide a mirrored symmetry about a plurality of drive axes for more uniform propagation of vibration between the various nodes and antinodes of the system. Watson further discloses a method for minimizing or reducing the signals at the nodes of the oscillation pattern by changing the relative amplitudes of the drive signals along respective skewed drive axes, thus shifting the position of the node on the resonator.

The above disclosed techniques and systems that focus on electronically compensating for the quadrature signal do not improve the tuning of the gyroscope. That is, each of the disclosures imposes a force (e.g., the separate torque elements of Fell I or the differing amplitudes of Watson) or simply establishes the error as a known quantity (e.g., the phase-lock system of Fell II). None of these systems or techniques improve the tuning of the resonator assembly. The quadrature signal itself is indicative that energy introduced in the plurality of drive axes is dissipated in destructive interference. Systems that introduce additional forces to accomplish the compensation introduce still more energy that is also dissipated in destructive interference. Such dissipated energy is in many instances transferred to the structure supporting the resonator assembly, and can be reflected back to the resonator, causing additional signals of arbitrary phase that results in further biasing error in the rotational rate signal.

A vibrating structural gyroscope system that electronically improves the tuning of the VSG with respect to the inherent tuning error represented by the quadrature signal, rather than merely attempting to compensate for the inherent tuning error of the VSG, would be welcome.

SUMMARY OF THE INVENTION

Various embodiments of the invention include an apparatus and/or method that corrects for tuning errors in vibrating structure gyroscopes that are configured to be driven along a plurality of axes by correcting for the quadrature signal directly along the input of the drive axes and without use or need for dedicated torque elements. The correction is accomplished by introducing a phase offset in the drive signal of one or more of the drive elements relative to other drive elements to minimize or reduce the quadrature signal. The tuning may be accomplished as a one time "set and forget" adjustment, as a manual adjustment performed at the discretion of the user, or as a closed loop active correction system. The technique improves the tuning of the resonator assembly, rather than merely compensating for inherent tuning errors. Accordingly, for various embodiments of the invention, the destructive interference between the plurality of drive axes is reduced. Conservation of vibrational energy present in the resonator is thus enhanced, with less vibrational energy transferred to the support structure.

A resonator assembly typically comprises a resonator element with drive and sense elements. Each of these components can introduce non-uniformities to the resonator assembly. For example, the resonator element may have a thickness or density that varies over the vibrating portion. Also, the drive and/or sense elements may also be of varying thickness or density and/or of non-uniform size. Machining errors and mask misalignment can also contribute to non-uniformity. Furthermore, the various appurtenances that interface with the resonator assembly (e.g., wires, contact tabs) and that hold the assembly together (e.g., solder, adhesives for the elements) can also be of differing mass between the elements, thereby introducing further non-uniformities to the resonator assembly. Moreover, thermal gradients (transient or steady state) that are present on the resonator assembly can introduce further non-uniformities. Accordingly, a given portion of the resonator assembly may have a resonant frequency that differs from the counterpart portions of the resonator and/or the resonator as a whole.

The non-uniformities of the resonator assembly can cause a quadrature signal to appear at the sense element. A phase offset in the time domain between the resonator as a whole and a portion of the resonator can manifest itself as a distortion of the sense signal in an out-of-phase (i.e. quadrature) vibration pattern. The out-of-phase vibrational pattern thus imposes a vibrational amplitude at the location of the node that results in a quadrature signal.

Without limiting the present application to a particular theory, the aforementioned non-uniformities are believed to cause different resonant frequencies when the resonator assembly is driven along different axes. Consider a resonator assembly that is driven into resonance along two independent drive axes. The resonant frequency of the resonator assembly is often different when driven along the first drive axis than when driven along the second drive axis, and again different when driven along both drive axes.

Embodiments of the present invention take advantage of the variation between the resonant frequencies of a resonator assembly generated along two (or more) drive axes. The phase difference between the vibration characteristics can be used to correct the input drive signals of the drive elements along the respective axes so that phase difference and the attendant quadrature signal is reduced, minimized or substantively eliminated.

Structurally, various embodiments of the invention comprise a resonator assembly that is driven along at least two drive axes, such as axisymmetric resonators (e.g., ring or cup and tuning fork configurations). The axes may be coincident, or they may be offset with respect to each other. Herein, an "axisymmetric resonator" is one that defines a central axis and wherein the mass of the resonator is distributed substantially equally on both sides of any plane that includes the central axis.

In one embodiment, a method for controlling the quadrature of a vibrating structure gyroscope is implemented that involves providing a resonator assembly including an axisymmetric resonator and a plurality of drive elements operatively coupled with the resonator, the drive elements adapted to sustain a resonant oscillation pattern on the axisymmetric resonator. In this embodiment, a first of the drive elements is adapted to be driven along a first drive axis and a second of the plurality of drive elements adapted to be driven along a second drive axis. The first and second drive axes may be coincident or may be offset with respect to each other. At least one sense element is operatively coupled with the axisymmetric resonator and adapted to detect a rotation rate. In some embodiments, the at least one sense element can be adapted to sense a driving oscillation of the resonator assembly as well. The method further comprises driving the resonator assembly along the first drive axis with the first of the drive elements in accordance with a first drive signal, and driving the resonator assembly along the second drive axis with the second of the drive elements in accordance with a second drive signal. A rotation rate signal is measured while the resonator assembly is driven along the first and second drive axes and quadrature signal is inferred from the rotation rate signal. The method further comprises imposing a combined phase offset between the first and second drive signals so that the quadrature signal is maintained at a desired level. The combined phase offset may be accomplished by imposing a first phase offset on the first drive signal and a second phase offset on the second drive signal, the second phase offset being opposite of and substantially equal to the first phase offset. The quadrature signal can be maintained at a minimum magnitude, or maintained at a known but tolerable level for detection of demodulation phase errors.

In some embodiments, the method further includes providing at least one drive sensor adapted to sense a driving oscillation of the resonator assembly, providing a phase-locked loop driving system having an input operatively coupled with the at least one driving sensor and having outputs operatively coupled to the first and the second of the plurality of drive elements and causing the phase-locked loop driving system to output the first and the second drive signals, the first and the second drive signals having a frequency that substantially matches the frequency of the drive oscillation.

In certain embodiments, the drive elements of the resonator assembly are adapted to sustain the oscillation pattern to include a plurality of anti-node pairs that define a plurality of reference axes when the resonator assembly is rotationally at rest, each of the anti-node pairs being diametrically opposed about the central axis, each of the plurality of reference axes passing through a corresponding one of the plurality of anti-node pairs. In these embodiments, the first drive axis of the resonator assembly is offset by a first rotational offset relative to a first of the plurality of reference axes, the first drive axis being other than coincident with any of the plurality of reference axes. Also, the second drive axis of the resonator assembly provided in the step of providing is offset by a second rotational offset relative to a second of the plurality of reference axes, the second drive axis being other than coincident with any of the plurality of reference axes, the second rotational offset being in a direction opposite from the first rotational offset.

A quadrature controlled vibrating structure gyroscope (QCVSG) is disclosed in an embodiment of the invention. The QCVSG comprises a resonator assembly including an axisymmetric resonator defining a central axis. The resonator assembly may include (but is not limited to) a resonator selected from the group consisting of a cup resonator, a hemispherical resonator, a ring resonator, a two-tine fork resonator and a four-tine fork resonator. The QCVSG may include a plurality of drive elements operatively coupled with the resonator and adapted to sustain a resonant oscillation pattern on the axisymmetric resonator, a first of the drive elements adapted to be driven along a first drive axis, a second of the plurality of drive elements adapted to be driven along a second drive axis. The first and second drive axes may be substantially coincident or offset with respect to each other. The offset can be a rotational offset. At least one sense element is operatively coupled with the axisymmetric resonator, the at least one sense element being adapted to detect a rotation rate signal. The QCVSG further includes a control system operatively coupled with the plurality of drive elements and adapted to sustain an oscillation pattern on the axisymmetric resonator and to infer a quadrature component from said rotation rate signal, the control system further being adapted to control a combined phase offset between the first and second drive elements for control of the magnitude of the quadrature component.

In some embodiments, the QCVSG is configured so that the control system and the drive elements are adapted to sustain the oscillation pattern to include a plurality of anti-node pairs that define a plurality of reference axes when the resonator assembly is rotationally at rest, each of the anti-node pairs being diametrically opposed about the central axis, each of the plurality of reference axes passing through a corresponding one of the plurality of anti-node pairs. The first drive axis can be offset by a first rotational offset relative to a first of the plurality of reference axes, the first drive axis being other than coincident with any of the plurality of reference axes. The second drive axis can be offset by a second rotational offset relative to a second of the plurality of reference axes, the second drive axis being other than coincident with any of the plurality of reference axes, the second rotational offset being in a direction opposite from the first rotational offset. In some embodiments, the control system of the QCVSG is operatively coupled with the at least one sense element, the control system being a closed loop control system that utilizes the quadrature signal as a feedback signal. The QCVSG may further include an automatic gain control adapted to provide the amplitude of the drive signal, a quadrature phase adjustment source adapted to provide the phase offset, a sine wave reference adapted to provide a $SIN(\omega t)$ function, and a cosine wave reference adapted to provide the $COS(\omega t)$ function.

In one embodiment, the QCSVG is adapted for control by a central microprocessor. The central microprocessor is operatively coupled to the axisymmetric resonator and a computer-readable medium. In this embodiment, the computer-readable medium includes instructions for control of the quadrature controlled vibrating structure gyroscope. The instructions include: driving the resonator assembly along the first drive axis in accordance with a first drive signal; driving the resonator assembly along the second drive axis in accordance with a second drive signal; measuring a rotation rate signal while the resonator assembly is driven along the first and second drive axes; inferring a quadrature signal from the rotation rate signal; and imposing a combined phase offset between the first and second drive signals so that the quadrature signal is maintained at a desired level. The desired level may be of minimum magnitude.

DETAILED DESCRIPTION

Figure 1:
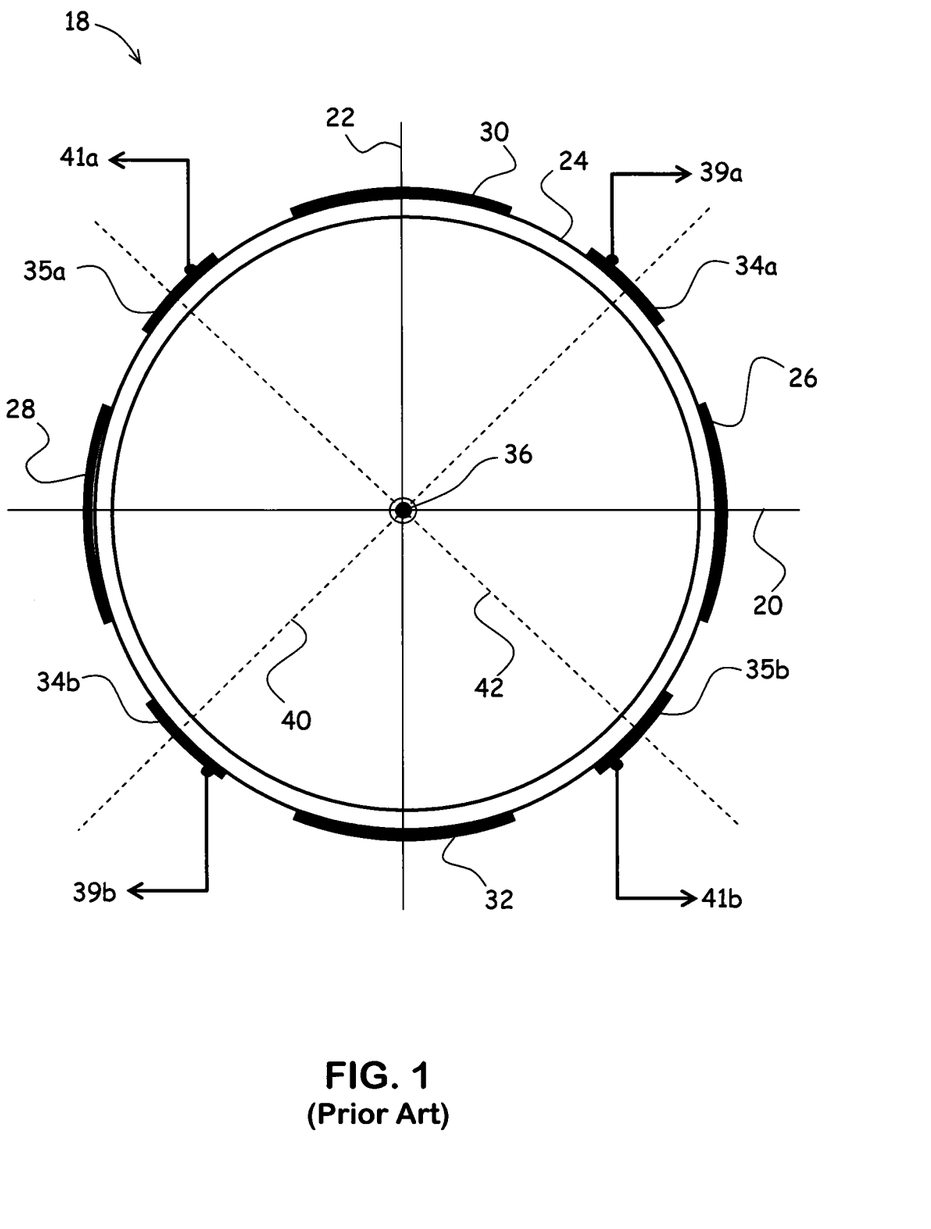
FIG. 1 depicts a cup resonator assembly that is driven along two drive axes.

Referring to FIG. 1, an example of a resonator assembly 18 that can be driven along two independent drive axes 20 and 22 is depicted to establish nomenclature. The resonator assembly 18 includes a resonator element 24 (depicted as a cup resonator), a first pair of drive elements 26, 28, a second pair of drive elements 30, 32, and various sense element pairs 34a, 34b and 35a, 35b. Both drive element pairs 26, 28 and 30, 32 are operatively coupled with the resonator element 24, the resonator element 24 defining a central axis 36 about which rotation of the resonator assembly 18 is sensed.

The drive elements 26, 28 and 30, 32 of each drive element pair are positioned in diametric opposition to each other about the central axis 36. In this embodiment, the first and second drive element pairs 26, 28 and 30, 32 define the first drive axis 20 and the second drive axis 22, respectively. Herein, a "drive axis" defines a vector along which a forcing function is imposed to sustain an oscillation pattern on a given resonator assembly. Accordingly, for the resonator assembly 18 depicted in FIG. 1, each of the drive axes 20 and 22 passes substantially through the center of the drive elements of the respective drive element pair 26, 28 and 30, 32. It is noted that for other configurations drive axes do not pass through the centers of drive elements (see, e.g., FIGS. 7, 7A and 8 and attendant discussion).

The drive axes 20 and 22 of the resonator assembly 18 are oriented at substantially 90° with respect to each other. More generally, the second drive axis 22 of the FIG. 1 embodiment is located at an antinode location of a vibration pattern generated by the first drive axis 20, and vice-versa. The sense element pairs 34a, 34b and 35a, 35b may be located proximate the node location of the vibration pattern and each adapted to generate respective output signals 39a, 39b, 41a and 41b indicative of the local oscillation (amplitude and frequency). The sense element pairs 34a, 34b and 35a, 35b may also define a pair of sense element axes 40 and 42, respectively.

Referring to FIGS. 2 through 5, various amplitude and phase characteristics of a resonator assembly (e.g., resonator assembly 18) as a function of the drive frequency are described. Each of the FIGS. 2 through 5 present an amplitude ratio ordinate 46 (logarithmic) and a phase ordinate 48 (linear), both referenced against a frequency ratio abscissa 50 (logarithmic). The amplitude ratio ordinate 46 represents the ratio of the vibration amplitude of the resonator assembly to the amplitude of the drive element. The frequency ratio abscissa 50 represents the ratio of the drive frequency $\omega$ to the resonant or natural frequency $\omega_N$ of the resonator assembly. An amplitude curve or function 52 (or 52a, 52b or 52c) is plotted against the amplitude ordinate and a phase curve or function 54 (or 54a, 54b or 54c) is plotted against the phase ordinate 48.

Figure 2:
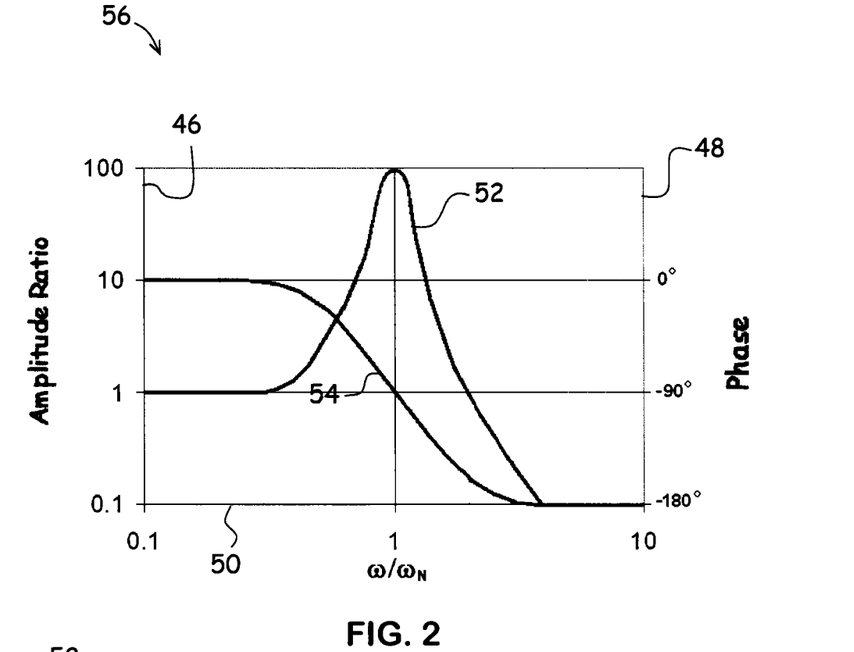
FIG. 2 depicts the vibration amplitude and phase vs. frequency for an ideal VSG having an overall resonant frequency of $\omega_N$.

FIG. 2 depicts ideal amplitude and phase characteristics 56, i.e. the characteristics that an ideal resonator. Note that the amplitude function 52 is at unity with and in phase with the drive amplitude at low frequency ratios (e.g., the amplitude ratio of 1 at the frequency ratio of 0.1 in FIG. 2). At high frequency ratios, the amplitude function 52 is very low relative to the drive amplitude, and lags in phase by 180 degrees as represented by the phase function 54 (e.g., the negligible amplitude ratio at the frequency ratio of 10 in FIG. 2). When the drive frequency is at the resonant frequency $\omega_N$ of the resonator assembly (frequency ratio of unity), the amplitude function 52 are much higher than the drive amplitude, and the phase function 54 depicts that the lag of the vibrations of the resonator lag the drive amplitude by −90 degrees.

Figure 3:
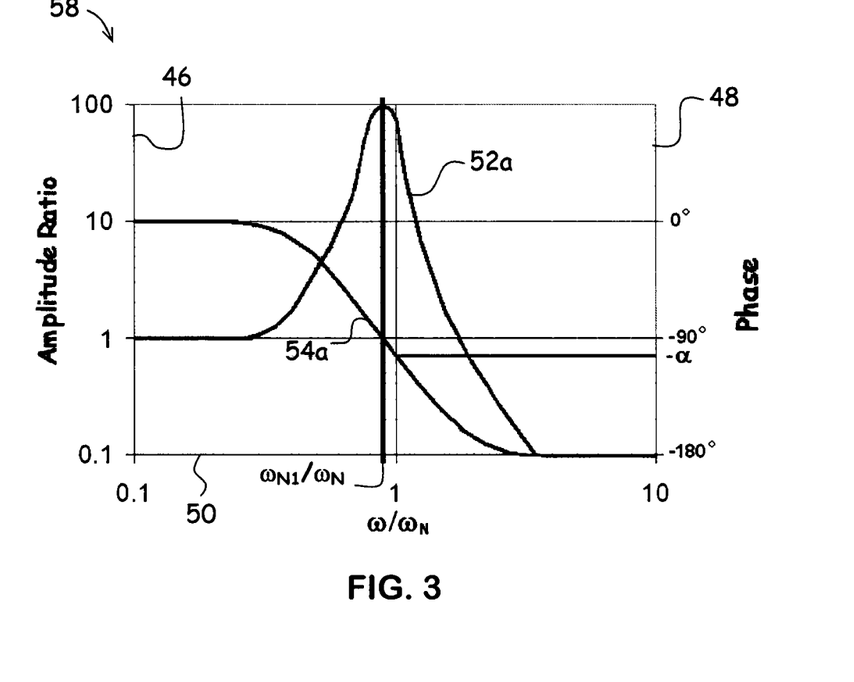
FIG. 3 depicts the vibration amplitude and phase vs. frequency for a VSG driven along a first drive axis that produces a resonant frequency $\omega_{N1}$ that is at a lower frequency than the overall resonant frequency $\omega_N$ of the VSG in an embodiment of the invention.
Figure 4:
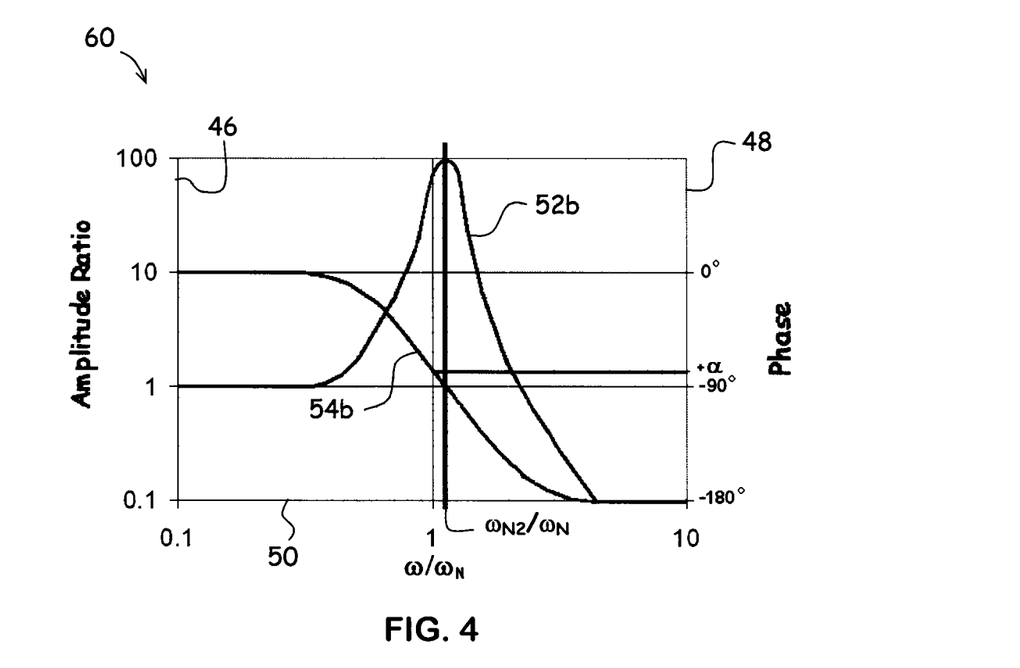
FIG. 4 depicts the vibration amplitude and phase vs. frequency for the VSG characterized in FIG. 3 driven along a second drive axis that produces a resonant frequency $\omega_{N2}$ that is at a higher frequency than the overall resonant frequency $\omega_N$ of the VSG in an embodiment of the invention.

Consider now a non-ideal resonator that is driven along two or more drive axes, and having amplitude and phase characteristics as depicted in FIGS. 3 and 4, respectively. While the resonator may have an overall or system resonant frequency of $\omega_N$ when driven along all the drive axes, the resonant frequency of the resonator may be different from the system resonant frequency $\omega_N$ when driven only along a first of the drive axes. That is, the resonator may have a first axis-driven resonant frequency $\omega_{N1}$ (FIG. 3) and a second axis-driven resonant frequency $\omega_{N1}$ (FIG. 4) that differ substantially from each other and from the system resonant frequency $\omega_N$.

Here, the amplitude function 52a of the first axis-driven frequency characteristics 58 of the resonator assembly (FIG. 3) are depicted as having a decreased magnitude at the system resonant frequency $\omega_N$ relative to the magnitude of the amplitude function 52a at $\omega_{N1}$. The phase function 54a of the first axis-driven frequency characteristics 58 is said to have a phase offset $\alpha$ at the system resonant frequency $\omega_N$ such that the phase function 54a is at −(90+$\alpha$) (that is, −90−$\alpha$) at $\omega=\omega_N$.

Likewise, the amplitude function 52b of the second axis-driven frequency characteristics 60 of the resonator assembly (FIG. 4) is also depicted as having a decreased magnitude at the system resonant frequency $\omega_N$ relative to the magnitude of the amplitude function 52b at $\omega_{N2}$, but with the phase function 54b at −(90−$\alpha$) (that is, −90+$\alpha$) at the system resonant frequency $\omega_N$.

Figure 5:
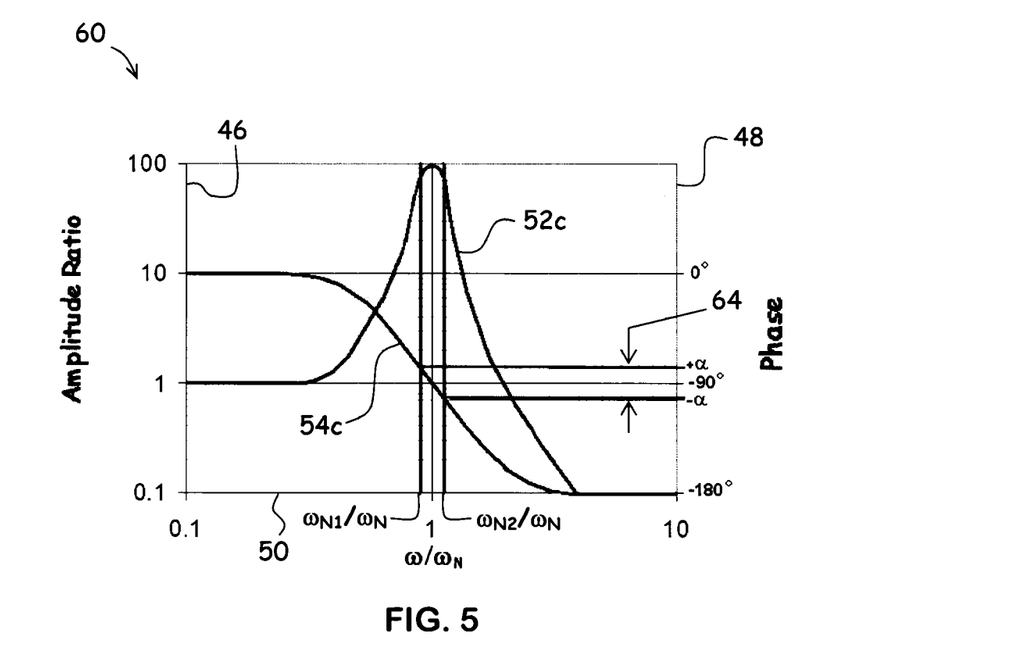
FIG. 5 depicts the phase deviations of the vibration amplitude and phase vs. a composite frequency of the VSG characterized in FIGS. 3 and 4 driven along the first and second drive axes in an embodiment of the invention.

For dual drive axis systems such as depicted in FIG. 1, the resonant frequency $\omega_N$ of the resonator assembly 18 when driven along both drive axes 20 and 22 may be roughly the average of the first and second axis-driven resonant frequencies $\omega_{N1}$ and $\omega_{N2}$. The phase functions 54a and 54b may be said to have a combined phase offset 64 relative to each other and having magnitude of 2$\alpha$, with the 90° phase lag being arbitrarily chosen at the midspan of the 2$\alpha$ interval (FIG. 5).

A method of the various embodiments of the invention is to drive each of the drive axes (e.g., 20 and 22) at an appropriate phase relative to each other or relative to the aggregate characteristics of the resonator assembly to compensate for the differences between the respective axis-driven characteristics 58 and 60. By establishing the proper phase difference between the drive functions imposed on the respective drive axes, a tuned amplitude and phase characteristic 62 having an amplitude function 52c and a phase function 54c results that more closely approximates the ideal amplitude and phase characteristics 56.

In some embodiments, the phase compensation takes the form of a preset signal established to minimize the quadrature signal at a nominal operating condition. In other embodiments, the phase compensation may be manually set for an existing operating condition to reduce the quadrature signal.

In still other embodiments, the phase compensation is provided as a closed loop active correction system for dynamic minimization or reduction of the quadrature signal across a range of operating conditions.

A phase compensation technique for resonator assemblies that are driven along two axes is now described mathematically. To affect correction of the quadrature signal in accordance with certain embodiments of the invention, it is desired that a total phase difference equal to the combined phase offset 64 of 2α be sustained between the first and second drive axes. Accordingly, desired drive signals D1 and D2 for the first and second drive axes, respectively, are expressed as:

$$D1 = K \cdot \text{SIN}(\omega t + \alpha) \quad \text{Eqn. (1)}$$

$$D2 = -K \cdot \text{SIN}(\omega t - \alpha) \quad \text{Eqn. (2)}$$

where K is the amplitude of the drive signal (e.g., in volts), ω is the drive frequency and t is a time parameter. The trigonometric identity for the sine of the sum of two angles is:

$$\text{SIN}(\omega t + \alpha) = \text{COS}(\alpha)\text{SIN}(\omega t) + \text{SIN}(\alpha)\text{COS}(\omega t) \quad \text{Eqn. (3)}$$

For small angles α, Eqn. (3) simplifies to $$\text{SIN}(\omega t + \alpha) = \text{SIN}(\omega t) + \alpha \cdot \text{COS}(\omega t) \quad \text{Eqn. (4)}$$

Therefore, the drive signals D1 and D2 may be expressed as $$D1 = K \cdot \text{SIN}(\omega t) + K\alpha \cdot \text{COS}(\omega t) \quad \text{Eqn. (5)}$$

$$\begin{aligned} D2 &= -K \cdot \text{SIN}(\omega t) + K\alpha \cdot \text{COS}(\omega t) \\ &= -K \cdot \text{SIN}(\omega t) + P \cdot \text{COS}(\omega t) \end{aligned} \quad \text{Eqn. (6)}$$

Figure 6:
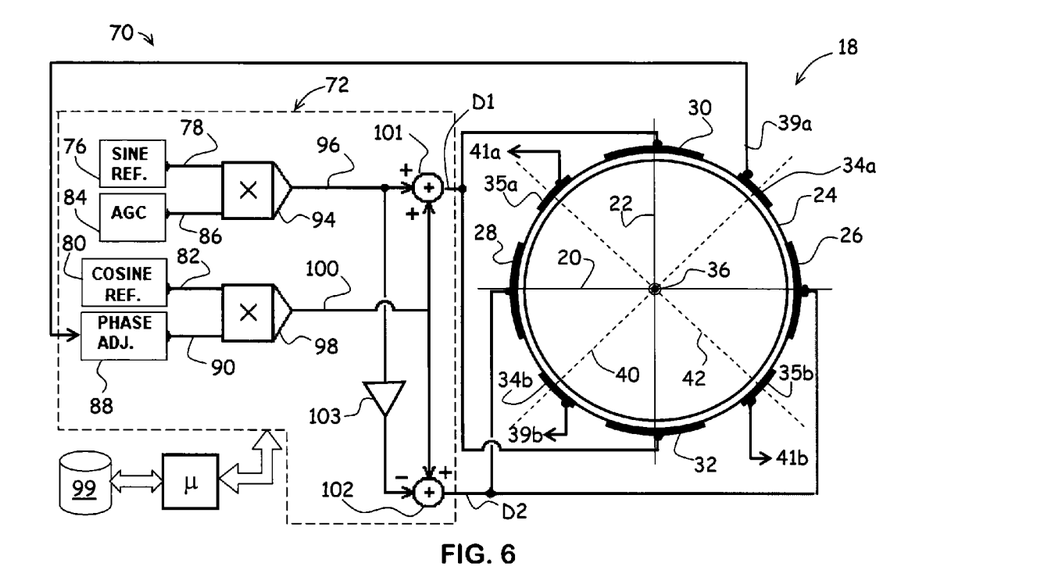
FIG. 6 is a schematic of a quadrature control drive circuit operatively coupled to a cup gyroscope in an embodiment of the invention.

The expression Kα·COS(ωt) is herein referred to as the phase adjustment component P·COS(ωt), where P=Kα and is the amplitude of the quadrature phase adjustment signal (e.g., numerical reference 90 at FIG. 6).

Accordingly, the trigonometric functions of the drive signals D1 and D2 of Eqns. (5) and (6) are expressed solely in terms of the drive frequency-time product ωt, so that the various components of the drive signals D1 and D2 are readily implemented by electronic circuitry and/or computer control. Example embodiments that implement Eqns. (5) and (6) are presented below.

Referring to FIG. 6, a quadrature-controlled vibrating structure gyroscope (QCVSG) 70 is depicted in an embodiment of the invention. The QCVSG 70 includes the resonator assembly 18 operatively coupled to a quadrature control system 72. In the depicted embodiment, the quadrature control system 72 includes: a sine wave reference 76 for outputting a sine wave reference signal 78; a cosine wave reference 80 for outputting a cosine wave reference signal 82; an automatic gain control (AGC) 84 for outputting an AGC signal 86 that affects the amplitude of the drive signal K; and a quadrature phase adjustment source 88 for outputting a quadrature phase adjustment signal 90 that affects the amplitude P of the phase adjustment component P·COS(ωt). The sine wave reference signal 78 and the AGC signal 86 may be routed through a first signal multiplier 94 to produce a variable gain sine wave signal 96. The cosine wave reference signal 82 and the quadrature phase adjustment signal 90 may be routed through a second multiplier 98 to produce a phase adjustment cosine signal 100.

In this embodiment, the phase adjustment source 88 can comprise a demodulator that accepts and demodulates the output signal 39*a* indicative of rotation rate in an out-of-phase manner with respect to the drive oscillation to provide the quadrature signal. The phase adjustment source 88 may also include a filter system to provide a conditioned quadrature phase adjustment signal 90. While only one rotation rate signal is depicted as being utilized for the phase adjustment source 88, those skilled in the art will recognize that any or all of the output signals 39*b*, 41*a* and 41*b* may optionally be utilized as well.

In certain embodiments, the variable gain sine wave signal 96 and the phase adjustment cosine signal 100 are routed in parallel to first and second adders 101 and 102, respectively, to produce the first and second drive signals D1 and D2, respectively, with the variable gain sine wave signal 96 being routed through an inverter 103 to affect the subtraction operation of Eqn. (6). The first and second drive signals D1 and D2 are routed to the first and second drive element pairs 26, 28 and 30, 32, respectively.

The various components of the QCVSG 70 may comprise hardware electronics that execute the various functions of the QCVSG 70 without need for a central processor. Alternatively, the QCVSG 70 may be adapted for control by a central microprocessor μ that controls the QCVSG 70 pursuant instructions (e.g., software or firmware) stored on a computer-readable medium 99.

In operation, the quadrature control system 72 executes the phase compensation described at Eqns. (5) and (6). The various control components of the quadrature control system 72 can relate to the various variables and functions of Eqns. (5) and (6) as follows: The amplitude of the drive signal K may be affected by the AGC 84; the phase offset α may be affected by the quadrature phase adjustment source 88; the SIN(ωt) function may be affected by the sine wave reference 76; and the COS(ωt) function may be affected by the cosine wave reference 80.

The foregoing focuses on the manifestation of Eqns. (5) and (6). It is understood, however, that other circuitry and/or computer controlled embodiments may be implemented to affect any of the Eqns. (1) through (6) or their equivalents, and still be within the scope of the invention.

While the resonator assembly in the embodiment of FIG. 6 is depicted as having drive element pairs and sense element pairs, it is understood that single elements may be utilized in place of any of the drive or sense element pairs. The respective drive and/or sense element axes in such an arrangement is defined as substantially normal to the single respective element and may pass near or through the central axis.

Figure 7:
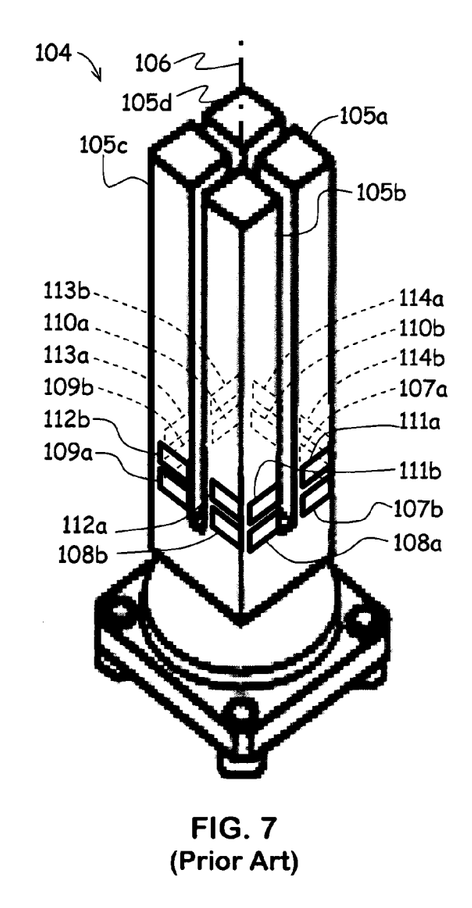
FIG. 7 depicts a 4-tine fork resonator assembly that is driven along two diagonal axes.

Referring to FIG. 7, a 4-tine fork resonator assembly 104 having four tines 105*a*, 105*b*, 105*c* and 105*d* and defining a central axis 106 is depicted. The 4-tine fork resonator assembly 104 depicted in FIG. 7 is the QUAPASON gyroscope, commercially available from Sagem of Paris, France. A gyroscope implementing a 4-tine fork resonator assembly is also depicted in U.S. Pat. No. 5,597,955 to Leger, et al., which is hereby incorporated by reference in its entirety except for explicit definitions contained therein.

It is noted that the 4-tine fork resonator assembly 104 is an "axisymmetric" resonator because the mass of the 4-tine fork resonator assembly 104 is equally distributed on both sides of any plane that includes the central axis 106.

The 4-tine fork resonator assembly 104 includes four drive element pairs 107, 108, 109 and 110, and four sense element pairs 111, 112, 113 and 114. Each member of each pair in FIG. 7 is identified with "a" and "b" designations (e.g., 108*a* and 108*b*). The elements located on the aft side of the perspective view of FIG. 7 are depicted in phantom. Note that the pairing of the drive elements are on the corners of a respective tine (e.g., drive elements 108*a* and 108*b* on the outside corner of tine 105*b*), while the pairing of the sense elements is on the same face of the 4-tine fork resonator assembly 104 (e.g., sense elements 112a and 112b on the face of the 4-tine fork resonator assembly 104 defined by tines 105b and 105c). The drive element pairs 107, 108, 109 and 110 are centered substantially on a first plane that is normal to the central axis 106. Likewise, the sense element pairs 111, 112, 113 and 114 are centered substantially on a second plane that is normal to the central axis 106 (i.e. parallel to the first plane).

Figure 7A:
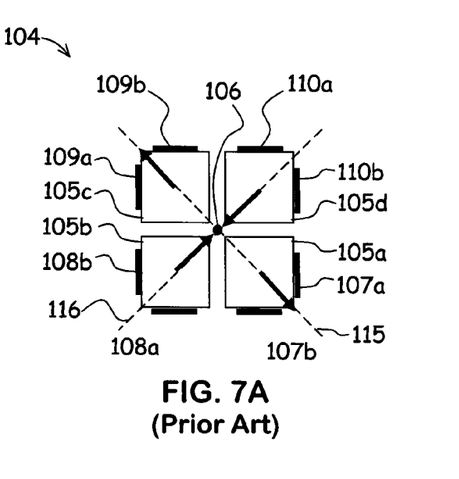
FIG. 7A is a plan view of the 4-tine fork resonator and drive elements of FIG. 7.

Referring to FIG. 7A, the 4-tine fork resonator assembly 104 is depicted as having a vibration pattern that causes the tines 105a, 105b, 105c and 105d to deflect toward the central axis 106. To produce this pattern, the drive element pairs that are diametrically or diagonally opposed (e.g., drive element pairs 107 and 109) are energized simultaneously to drive the diagonal tines toward the central axis 106. Also, activation of the diagonal pairs may be alternated so that when a first of the diagonal pairs (e.g., drive element pairs 107 and 109) is driven inward, a second of the diagonal pairs (e.g., drive element pairs 108 and 110) is driven outward, but with both diagonal pairs being driven at the same frequency. In this way, the tines 105a and 105c are driven diagonally along a drive axis 115 that passes substantially through the central axis 106. Likewise, the tines 105b and 105d are driven diagonally along a drive axis 116 and in complimentary oscillation (out of phase) with respect to tines 105a and 105c, as depicted in FIG. 7A.

The sense element pairs 111, 112, 113 and 114 of the 4-tine fork resonator assembly 104 are axially offset along the tines 105a, 105b, 105c and 105d relative to the location of the drive element pairs 107, 108, 109 and 110. The sense element pairs 111, 112, 113 and 114 as depicted in FIGS. 7 and 7A will each detect a component of the drive oscillation but in opposing phases so that addition of each member of sense element pairs will cancel the drive component.

Also, the drive components along each drive axis 115 and 116 can be inferred by adding the signals from the sense elements that are located on the opposing corners (e.g., the addition of signals from sense elements 111b, 112a, 113b and 114a to infer the drive component along drive axis 116).

Figure 8:
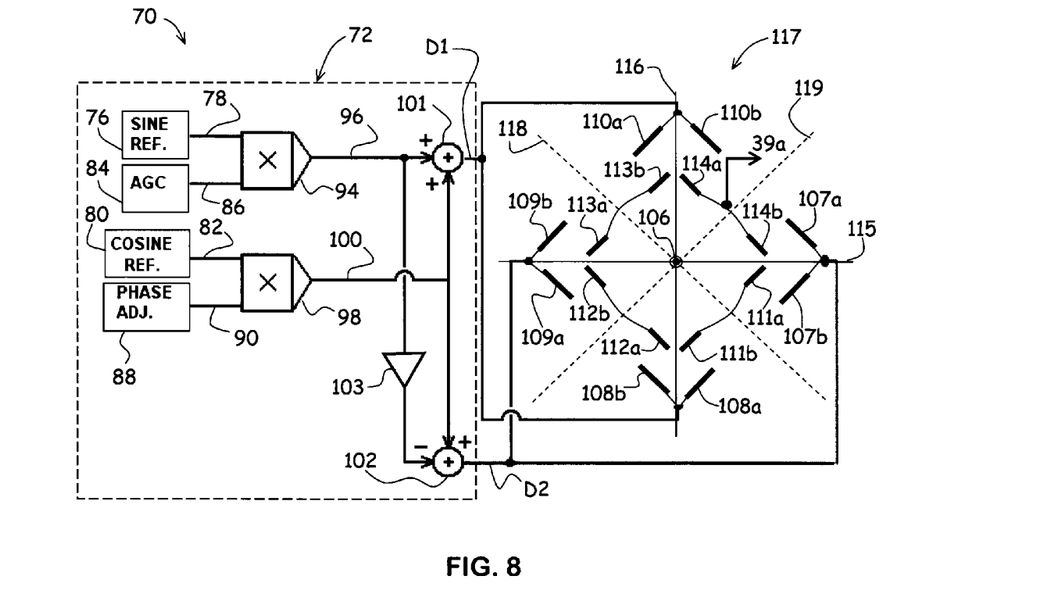
FIG. 8 is a schematic of a quadrature control drive circuit operatively coupled to the drive elements of a 4-tine fork gyroscope in an embodiment of the invention.

Referring to FIG. 8, a QCVSG 117 is depicted utilizing the 4-tine fork resonator assembly 104 as the resonator assembly in an embodiment of the invention. The same quadrature control system 72 as depicted for the QCVSG 70 of FIG. 6 may be utilized, by virtue of the dual axis drive. For the 4-tine fork resonator assembly 104, the drive axis 115 is defined as passing equidistant between and on the same plane as the centroids of the diagonally opposed drive element pairs 107 and 109. Likewise, the drive axis 116 is defined as passing equidistant between and on the same plane as the centroids of the diagonally opposed drive element pairs 108 and 110. Also, a pair of sense element axes 118 and 119 may be defined as passing equidistant between and on the same plane as the centroids of the diagonally opposed sense element pairs 111, 113 and 112, 114.

Figure 9:
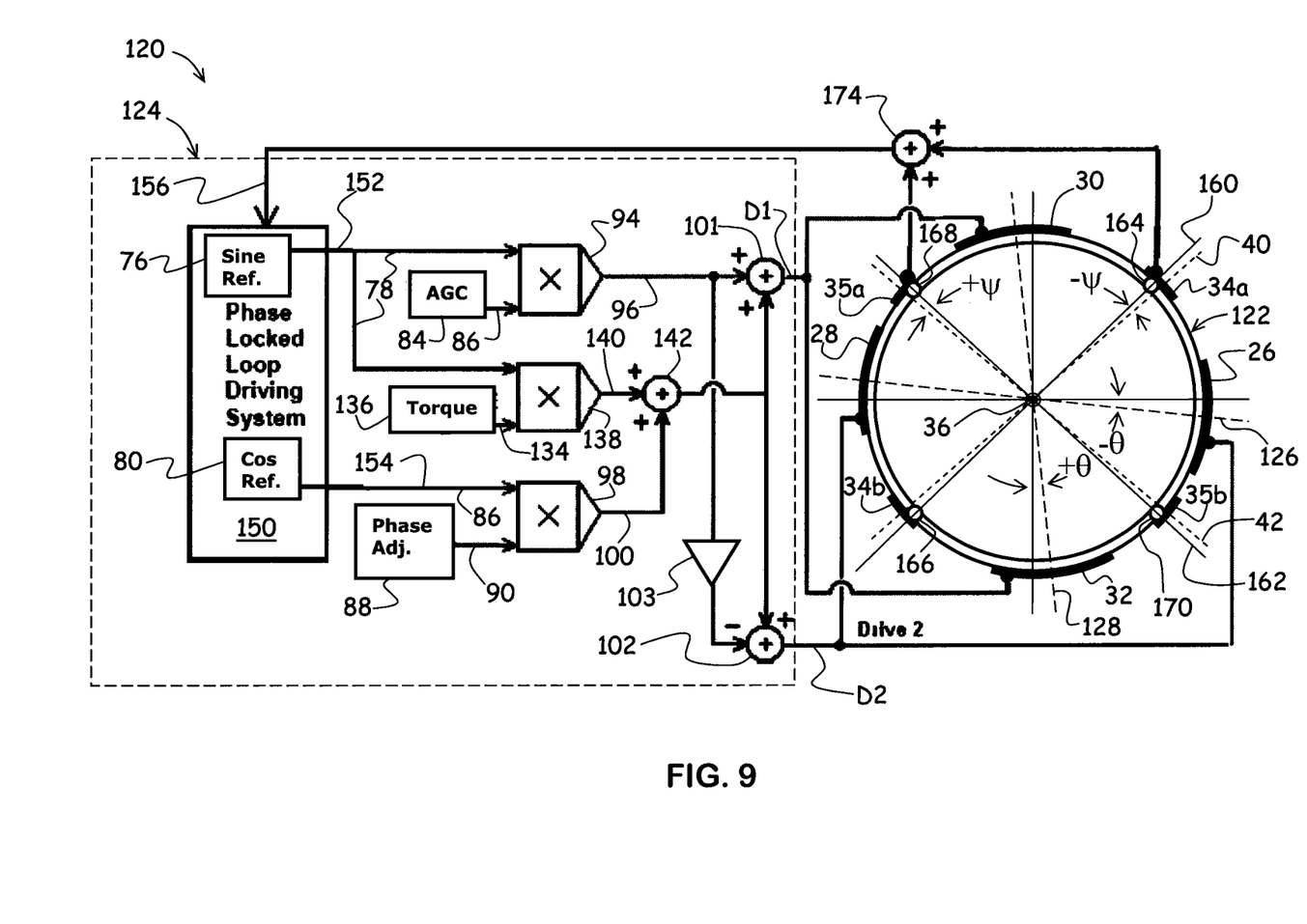
FIG. 9 is a schematic of a cup gyroscope having drive elements arranged along skewed drive axes and a quadrature control drive circuit utilizing a phase locked loop driving system in an embodiment of the invention.

Referring to FIG. 9, a skewed-drive QCVSG 120 is depicted in an embodiment of the invention. The skewed-drive QCVSG 120 includes a skewed-drive resonator assembly 122 and a torque-and-quadrature control system 124. The skewed-drive resonator assembly includes first and second drive axes 126 and 128 that pass substantially through the centers of the drive elements 26, 28 and 30, 32, respectively, and are "skewed" relative to a rotationally uniform distribution. That is, the first and second drive axes 126 and 128 are intentionally rotationally offset at angles of $-\Theta$ and $+\Theta$, respectively, relative to a 90° orientation. The skewed-drive resonator assembly 122 and the torque-and-quadrature control system 124 include many of the same components and aspects as the resonator assembly 18 and quadrature control system 72, identified by the same numerical references.

An advantage of the skewed-drive QCVSG 120 is that the drive elements 26, 28, and 32, in addition to sustaining the oscillation pattern on the skewed-drive resonator assembly 122, can torque the oscillation pattern, thus eliminating the need for an additional torque element or elements. Accordingly, in one embodiment, the drive signals D1 and D2 of Eqns. (5) and (6) are tailored to accomplish the torque function by adding a torque component:

$$D1 = K \cdot \text{SIN}(\omega t) + P \cdot \text{COS}(\omega t) + T \cdot \text{SIN}(\omega t) \qquad \text{Eqn. (7)}$$

$$D2 = -K \cdot \text{SIN}(\omega t) + P \cdot \text{COS}(\omega t) + T \cdot \text{SIN}(\omega t) \qquad \text{Eqn. (8)}$$

where $P = K\alpha$ as discussed in connection with Eqns. (5) and (6) above and T is the amplitude of a torque adjustment signal 134. The remaining parameters are the same as defined in connection with Eqns. (1) and (2).

It is further noted that once the QCVSG 120 is tuned, the phase offset $\alpha$ may be determined from K and P, that is $$\alpha = P/K \qquad \text{Eqn. (9)}$$

The combined phase offset 64, then, is given by $$2\alpha = 2P/K \qquad \text{Eqn. (10)}$$

The skewed-drive resonator assembly 122 includes many of the same components as the quadrature control system 72 of FIG. 6, which are identified by the same numerical reference numbers. In addition, the torque-and-quadrature control system 124 includes a torque signal source 136 for outputting the torque adjustment signal 134, a third signal multiplier 138 to produce a torque adjustment sine wave signal 140, and a third adder 142 for adding the torque and phase offset components. Also, for the skewed-drive resonator assembly 122, the quadrature phase adjustment signal 90 can be adjusted to set the quadrature at a desired level.

The method does not require the use of phase locked loops, but can be implemented in a phase locked loop driving system 150, as depicted in FIG. 9. The details of one such phase locked loop driving system is disclosed in U.S. Pat. No. 7,411,465, assigned to the assignee of the instant application and hereby incorporated by reference in its entirety except for express definitions included therein.

The phase-locked loop driving system 150 can enhance the performance by generating output signals 152, 154 that have a fixed relation to the phase of an input signal 156. A phase-locked loop circuit (not depicted) detects the phase difference between the outputs 152, 154 and the input 156 and uses the resulting difference between these signals signal to adjust frequency of an internal oscillator until the outputs 152, 154 matches the input 156 in both frequency and phase. Effectively, the phase-locked loop driving system 150 serves as a filter for reducing drive noise and the attendant system noise. When utilized, the phase locked loop driving system 150 is coupled to each of the multipliers 94, 98 and 138 depicted in FIG. 9.

In one embodiment, the input signal 156 to the phase-locked loop driving system 150 comprises a comparison of the drive oscillation of the resonator assembly with the drive signals D1 and D2 and thus requires a resonator assembly that is capable of measuring the drive oscillation. Herein, the "drive oscillation" is the resultant oscillation (amplitude and frequency) that is imposed on the resonator assembly by the drive signals D1 and/or D2. The sense elements 34a, 34b and 35a, 35b of the skewed-drive resonator assembly 122 depicted in FIG. 9 are coupled with the resonator element 24 so that the sense element axes 40 and 42 are skewed at angles of $-\psi$ and $+\psi$, respectively, in relation to nodal axes 160 and 162 that pass through node pairs 164, 166 and 168, 170, respectively, when the skewed-drive resonator assembly 122 is in operation and rotationally stationary. The skewed relationship between the sense element axes 40 and 42 and the nodal axes 160 and 162 imposes a component of the drive oscillation on the sense elements 34a, 34b and 35a, 35b that can be isolated by adding the output signals 39a and 39b from the sense element or elements 34a, 34b on the sense axis 40 with the output signals 41a and 41b from the sense element or elements 35a, 35b on the sense axis 42. A fourth adder 174 is depicted in FIG. 9 for this purpose. The details of the operation of the skewed sense configuration is described in U.S. Pat. No. 7,526,957, incorporated by reference above.

Other axisymmetric resonator assemblies may also be configured to provide a measurement of the drive oscillation. For example, the sense element pairs 111, 112, 113 and 114 of the 4-tine fork resonator assembly 104 of FIG. 7 can each detect a component of the drive oscillation such that subtraction of signals produced by elements on adjacent corners will isolate the drive oscillation component. For example, subtraction of the signals generated by sense elements 112b and 113a can provide an indication of the drive oscillation along the drive axis 115. Likewise, subtraction of the signals generated by the sense elements 113b and 114a can provide an indication of the drive oscillation along drive axis 116. Accordingly, those of skill in the art will recognize that the 4-tine fork resonator assembly 104 can be utilized with the phase-locked loop driving system 150.

Figure 10:
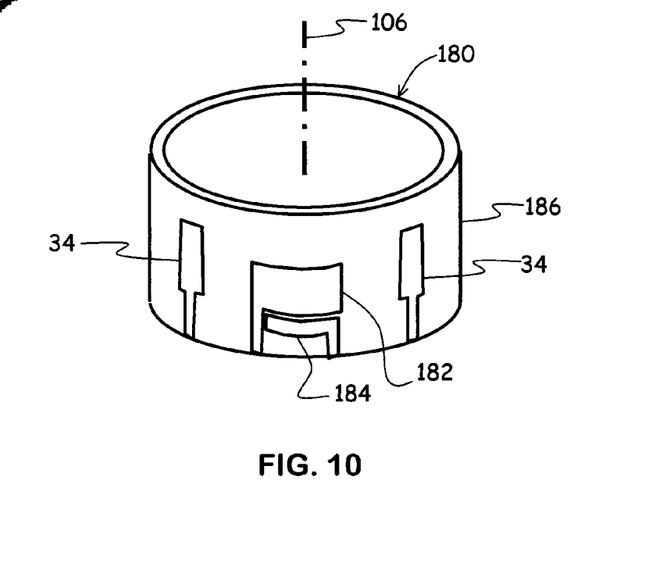
FIG. 10 is a perspective view of a cup gyroscope having a sense element located at the same radial location as a drive element for use in an embodiment of the invention.

Referring to FIG. 10, a cup resonator assembly 180 is depicted for use in an embodiment of the invention. The cup resonator assembly 180 includes drive elements 182 and sense elements 184 that are operatively coupled to a resonator element 186 at the same radial location but axially separated. The sense elements 184 thereby provide a measurement of the drive oscillation along the drive axis defined by the drive element 182, which can be implemented for the input signal 156 to the phase-locked loop driving system 150.

Figure 11:
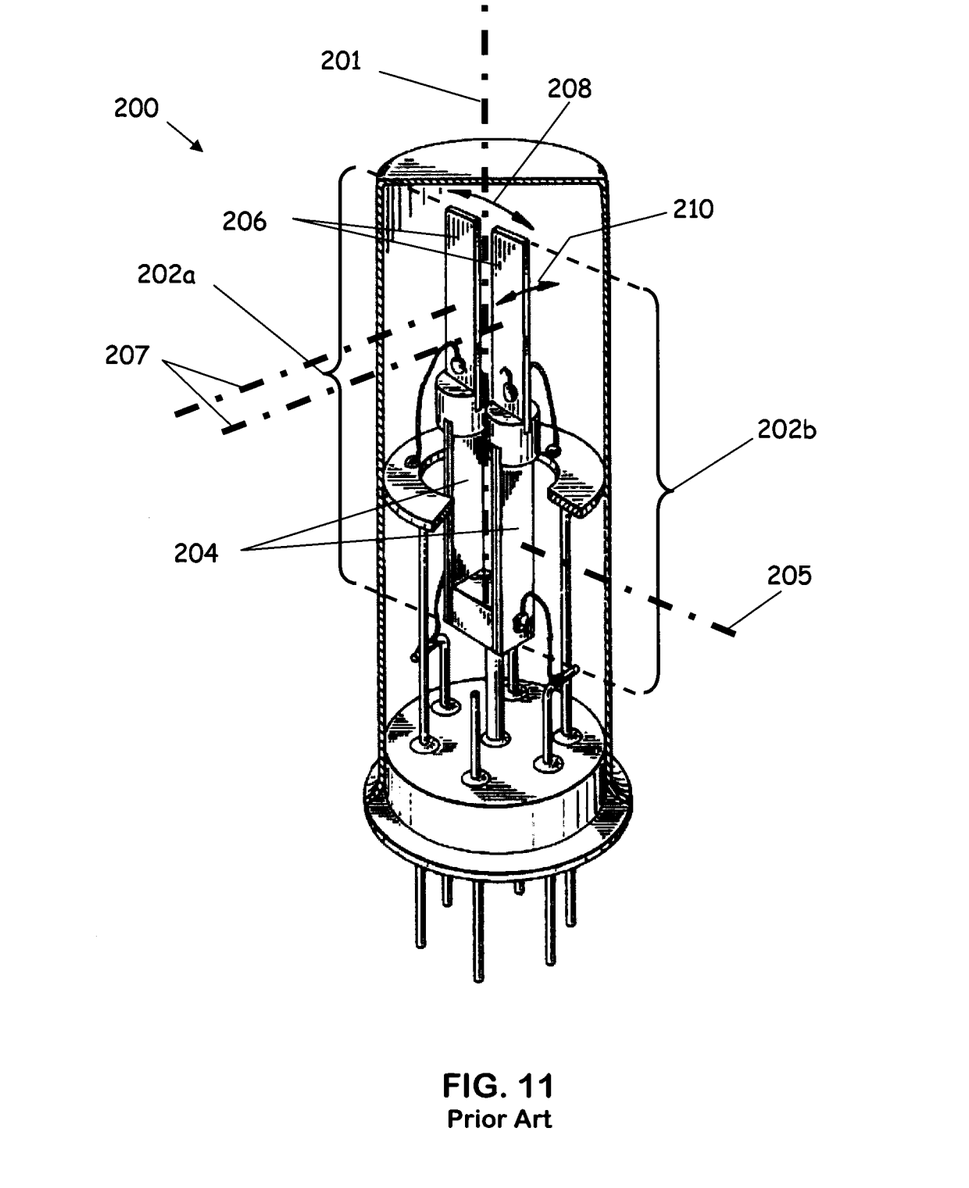
FIG. 11 is a perspective view of a 2-tine fork resonator assembly.
Figure 12:
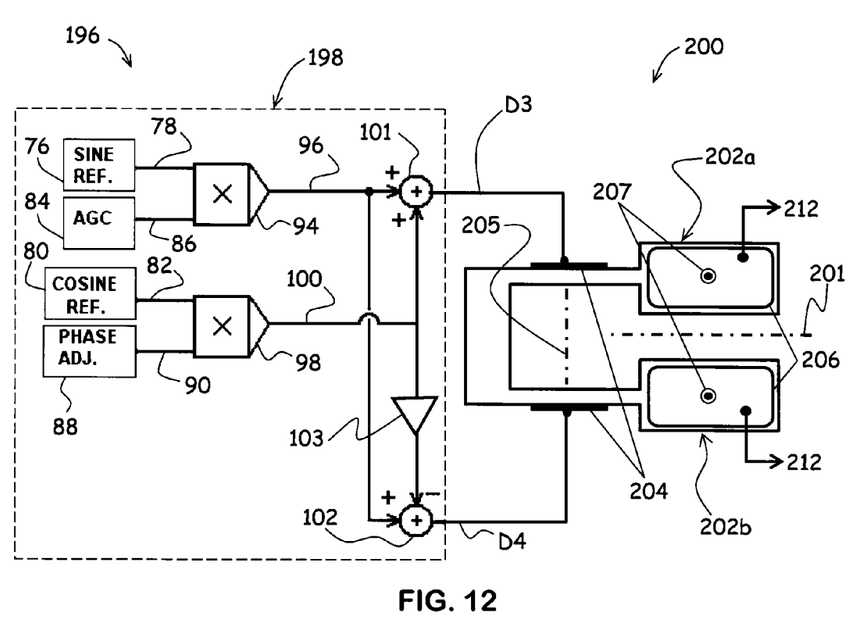
FIG. 12 is a schematic of a quadrature-controlled vibrating structure gyroscope implementing a 2-tine quadrature control system in an embodiment of the invention.

Referring to FIGS. 11 and 12, a QCVSG 196 implementing a 2-tine quadrature control system 198 and a 2-tine fork resonator assembly 200 having a tuning fork-like arrangement about a central axis 201 is illustrated in an embodiment of the invention. The 2-tine fork resonator assembly 200 has tines 202a and 202b, each comprising a drive element 204 adapted to be driven along a drive axis 205 and a sense element 206 adapted to sense vibration along a sensing axis 207 that is perpendicular to the major faces of the sense element 206. The drive elements 204, when energized, drives the tines 202a and 202b along the drive axes 205 and causes the tines 202a and 202b to oscillate in the direction indicated by vector 208. When the gyroscope 200 is rotated about the sensing axis 201, the sense elements 206 flex in the direction indicated by vector 210, generating signals 212 having an amplitude proportional to the rotation of the gyroscope 200 about the rotation sensing axis 201.

For the 2-tine fork resonator assembly 200, the tines 202a and 202b vibrate in opposition along substantially coincident drive axes 205. Because the drive elements 204 are on opposing faces of the 2-tine fork resonator assembly 200, both are driven with primary drive signals having the same polarity. A phase compensation technique for resonator assemblies that are driven along one axis as for a two-tine tuning fork and its variants is now described mathematically.

To affect correction of the quadrature signal in accordance with certain embodiments of the invention, it is desired that a total phase difference equal to the combined phase offset 64 of 2α be sustained between the first and second tines. Accordingly, desired drive signals D3 and D4 for the first and second tine drives, respectively, are expressed as:

$$D3 = K \cdot SIN(\omega t + \alpha) \quad \text{Eqn. (11)}$$

$$D4 = K \cdot SIN(\omega t - \alpha) \quad \text{Eqn. (12)}$$

where K is the amplitude of the drive signal (e.g., in volts), ω is the drive frequency and t is a time parameter. The trigonometric identity for the sine of the sum of two angles is:

$$SIN(\omega t + \alpha) = COS(\alpha)SIN(\omega t) + SIN(\alpha)COS(\omega t) \quad \text{Eqn. (13)}$$

For small angles α, Eqn. (13) simplifies to $$SIN(\omega t + \alpha) = SIN(\omega t) + \alpha\, COS(\omega t) \quad \text{Eqn. (14)}$$

Substituting Eqn. (14) into Eqns. (11) and (12), the drive signals D3 and D4 may be expressed as $$D3 = K \cdot SIN(\omega t) + K\alpha \cdot COS(\omega t) \quad \text{Eqn. (15)}$$

$$D4 = K \cdot SIN(\omega t) - K\alpha \cdot COS(\omega t) \quad \text{Eqn. (16)}$$

Accordingly, the trigonometric functions of the drive signals D3 and D4 of Eqns. (15) and (16) are expressed solely in terms of the drive frequency-time product ωt, so that the various components of the D3 and D4 functions are readily implemented by electronic circuitry and/or computer control.

Other resonator assemblies, such as microelectromechanical system (MEMS) gyroscopes and H-fork gyroscopes, are also driven along a common axes with same polarity primary drive signals. Examples of such gyroscopes are disclosed by U.S. Pat. No. 5,996,410 to Yachi et al.; Zaman, et al., "High Performance Matched-Mode Tuning Fork Gyroscope," MEMS 2006, Istanbul, Turkey, pp. 22-26, January 2006; and Trusov et al., "Gyroscope Architecture with Structurally Forced Anti-Phase Drive-Mode and Linearly Coupled Anti-Phase Sense-Mode," IEEE Transducers 2009, Denver Colo., USA, June 2009, the disclosures of which are hereby incorporated by reference in their entirety except for express definitions therein. Eqns. (10)-(15) may be implemented with these devices with the same result.

The 2-tine quadrature control system 198 includes many of the same components as the quadrature control system 72 of FIG. 6, which are identified by the same numerical reference numbers. A distinction between the 2-tine quadrature control system 198 and the quadrature control system 72 is that the inverter 103 inverts the phase adjustment cosine signal 100 going into the second adder 102 (instead of the variable gain sine wave signal 96) to affect the subtraction of the Kα·COS (ωt) component of Eqn. (16).

In still another embodiment of the invention, a phase compensation technique is implemented that involves utilizing a "controlled" bias. Consider the bias Bq of the rate signal caused by a demodulated quadrature signal Sq, given by $$Bq = K1 \cdot Sq \cdot \epsilon_{DM} \quad \text{Eqn. (17)}$$

where $\epsilon_{DM}$ is a demodulation phase error of the of the rate signal and K1 is the gain of the sensing system. The demodulation phase error $\epsilon_{DM}$ is herein defined as the difference between a desired or targeted demodulation phase and an actual demodulation phase.

In some cases, there may be intrinsic, phase-related phenomena that cause the demodulation phase error $\epsilon_{DM}$ (e.g., transitions caused by turn on drift or stresses from temperature changes). Such intrinsic causes could be compensated by a controlled bias such as Bq. This controlled bias may involve establishing a tolerable level of quadrature signal to use an intrinsic phase error to generate a specific bias. By tolerating a small amount of quadrature signal Sq, one can control that level of quadrature signal Sq to prevent larger quadrature signals of unknown quantity. In one embodiment, the objective is to use the demodulated quadrature signal Sq to compensate for these other bias error sources that tend to correlate with the demodulation phase error $\epsilon_{DM}$. Knowing the demodulated quadrature signal Sq, one can determine the magnitude of the demodulation phase error $\epsilon_{DM}$ and use the information to compensate for false indication of rotation rate.

The invention may be embodied in other specific forms without departing from the spirit or essential attributes thereof, and it is, therefore, to be understood that the depicted embodiments are in all respects as illustrative and not restrictive. For example, while the preceding description is directed to cup and four-tine gyroscopes, the methods and apparatuses described herein may be implemented with any gyroscope or resonator that utilizes more than one drive axis, including but not limited to cup resonators, hemispherical resonators, ring resonators and four-tine resonators.

The foregoing descriptions present numerous specific details that provide a thorough understanding of various embodiments of the present invention. Each of the figures and methods disclosed herein may be used separately, or in conjunction with other features and methods, to provide improved devices, systems and methods for making and using the same. Therefore, combinations of features and methods disclosed herein may not be necessary to practice the invention in its broadest sense and are instead disclosed merely to particularly describe representative embodiments of the invention.

It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention, which is defined solely by the claims that follow.

For purposes of interpreting the claims for the present invention, it is expressly intended that the provisions of Section 112, sixth paragraph of 35 U.S.C. are not to be invoked with respect to a given claim unless the specific terms "means for" or "step for" are recited in that claim.

What is claimed is:

1. A method for controlling a quadrature signal of a vibrating structure gyroscope, comprising:
    providing a resonator assembly including an axisymmetric resonator defining a
      central axis, a plurality of drive elements operatively coupled with said axisymmetric resonator and adapted to sustain a resonant oscillation pattern on said axisymmetric resonator, a first of said drive elements adapted to be driven along a first drive axis, a second of said plurality of drive elements adapted to be driven along a second drive axis, and at least one sense element operatively coupled with said axisymmetric resonator, said at least one sense element being adapted to detect a rotation rate;
    driving said resonator assembly along said first drive axis with said first of said drive elements and in accordance with a first drive signal;
    driving said resonator assembly along said second drive axis with said second of said drive elements and in accordance with a second drive signal;
    measuring a rotation rate signal from said at least one sense element while said resonator assembly is driven along said first drive axis and said second drive axis;
    inferring the quadrature signal from said rotation rate signal;
    imposing a combined phase offset between said first drive signal and said second drive signal so that said quadrature signal is maintained at a desired level.

2. The method of claim 1, wherein imposing said combined phase offset is performed such that said quadrature signal is maintained at a minimum magnitude.

3. The method of claim 1 wherein imposing said combined phase offset between said first drive signal and said second drive signal includes imposing a first phase offset on the first drive signal and a second phase offset on the second drive signal, said second phase offset being an opposite of and substantially equal to said first phase offset.

4. The method of claim 1 further comprising:
    providing at least one drive sensor adapted to sense a driving oscillation of the resonator assembly;
    providing a phase-locked loop driving system having an input operatively coupled with said at least one drive sensor and having outputs operatively coupled to said first and said second of said plurality of drive elements;
    causing said phase-locked loop driving system to output said first drive signal and said second drive signal, said first drive signal and said second drive signal having a frequency that substantially matches the frequency of said driving oscillation.

5. The method of claim 1 wherein said at least one sense element provided in the step of providing is adapted to sense a driving oscillation of the resonator assembly, the method further comprising:
    providing a phase-locked loop driving system having an input operatively coupled with at least one driving sensor and having outputs operatively coupled to said first and said second of said plurality of drive elements;
    causing said phase-locked loop driving system to output said first drive signal and said second drive signal, said first drive signal and said second drive signal having a frequency that substantially matches the frequency of said driving oscillation.

6. The method of claim 1:
    wherein said drive elements of said resonator assembly provided in said step of providing are adapted to sustain said resonant oscillation pattern to include a plurality of anti-node pairs that define a plurality of reference axes when said resonator assembly is rotationally at rest, each of said anti-node pairs being diametrically opposed about said central axis, each of said plurality of reference axes passing through a corresponding one of said plurality of anti-node pairs;
    wherein said first drive axis of said resonator assembly provided in said step of providing is offset by a first rotational offset relative to a first of said plurality of reference axes, said first drive axis being other than coincident with any of said plurality of reference axes; and
    wherein said second drive axis of said resonator assembly provided in said step of providing is offset by a second rotational offset relative to a second of said plurality of reference axes, said second drive axis being other than coincident with any of said plurality of reference axes, said second rotational offset being in a direction opposite from said first rotational offset.

7. The method of claim 1, wherein said first drive as and said second drive axis that are driven in said steps of driving are offset with respect to each other.

8. The method of claim 1, wherein said first and second drive axes that are driven in said steps of driving are substantially coincident.

9. The method of claim 1 further comprising obtaining a phase demodulation error.

10. A quadrature controlled vibrating structure gyroscope, comprising:
   a resonator assembly including:
      an axisymmetric resonator defining a central axis,
      a plurality of drive elements operatively coupled with said axisymmetric resonator, a first of said plurality of drive elements adapted to be driven along a first drive axis in accordance with a first drive signal, a second of said plurality of drive elements adapted to be driven along a second drive axis in accordance with a second drive signal, and
      at least one sense element operatively coupled with said axisymmetric resonator, said at least one sense element being adapted to detect a rotation rate; and
   a control system operatively coupled with said plurality of drive elements and adapted to sustain said a resonant oscillation pattern on said axisymmetric resonator and to infer a quadrature component from said rotation rate signal measured from said at least one sense element, said control system being further adapted to control a combined phase offset between said first drive signal and said second drive signal for control of the magnitude of said quadrature component.

11. The quadrature controlled vibrating structure gyroscope of claim 10, wherein said first drive axis and said second drive axis are rotationally offset relative to said central axis.

12. The quadrature controlled vibrating structure gyroscope of claim 11,
   wherein said control system and said drive elements are adapted to sustain said oscillation pattern to include a plurality of anti-node pairs that define a plurality of reference axes when said resonator assembly is rotationally at rest, each of said plurality of anti-node pairs being diametrically opposed about said central axis, each of said plurality of reference axes passing through a corresponding one of said plurality of anti-node pairs;
   wherein said first drive axis is offset by a first rotational offset relative to a first of said plurality of reference axes, said first drive axis being other than coincident with any of said plurality of reference axes; and
   wherein said second drive axis is offset by a second rotational offset relative to a second of said plurality of reference axes, said second drive axis being other than coincident with any of said plurality of reference axes, said second rotational offset being in a direction opposite from said first rotational offset.

13. The quadrature controlled vibrating structure gyroscope of claim 10 wherein said second drive axis is rotationally offset with respect to said first drive axis.

14. The quadrature controlled vibrating structure gyroscope of claim 10 wherein said control system is operatively coupled with said at least one sense element, said control system being a closed loop control system that utilizes said quadrature signal as a feedback signal.

15. The quadrature controlled vibrating structure gyroscope of claim 10 wherein said first drive element is adapted to be driven by a first drive signal defined by $$K \operatorname{SIN}(\omega t) + K\alpha \operatorname{COS}(\omega t)$$

and said second drive element is adapted to be driven by a second drive signal defined by $$K\alpha \operatorname{COS}(\omega t) - K \operatorname{SIN}(\omega t)$$

where K is an amplitude of said drive signal, $\alpha$ is a phase offset, $\omega$ is a drive frequency and t is a time parameter.

16. The quadrature controlled vibrating structure gyroscope of claim 15 wherein said control system further comprises:
   an automatic gain control adapted to provide said amplitude of said drive signal;
   a quadrature phase adjustment source adapted to provide said phase offset;
   a sine wave reference adapted to provide the $\operatorname{SIN}(\omega t)$ function; and
   a cosine wave reference adapted to provide the $\operatorname{COS}(\omega t)$ function.

17. The quadrature controlled vibrating structure gyroscope of claim 10 wherein said first drive element is adapted to be driven by a first drive signal defined by $$K \operatorname{SIN}(\omega t) + K\alpha \operatorname{COS}(\omega t)$$

and said second drive element is adapted to be driven by a second drive signal defined by $$K\alpha \operatorname{SIN}(\omega t) - K\alpha \operatorname{COS}(\omega t)$$

where K is an amplitude of said drive signal, $\alpha$ is a phase offset, $\omega$ is a drive frequency and t is a time parameter.

18. The quadrature controlled vibrating structure gyroscope of claim 17 wherein said control system further comprises:
   an automatic gain control adapted to provide said amplitude of said drive signal;
   a quadrature phase adjustment source adapted to provide said phase offset;
   a sine wave reference adapted to provide the $\operatorname{SIN}(\omega t)$ function; and
   a cosine wave reference adapted to provide the $\operatorname{COS}(\omega t)$ function.

19. The quadrature controlled vibrating structure gyroscope of claim 10 wherein said resonator assembly comprises an axisymmetric resonator selected from the group consisting of a cup resonator, a hemispherical resonator, a ring resonator, a two-tine fork resonator and a four-tine fork resonator.

20. A method for controlling a quadrature controlled vibrating structure gyroscope, comprising:
   providing a resonator assembly, said resonator assembly including:
      an axisymmetric resonator defining a central axis;
      a plurality of drive elements operatively coupled with said axisymmetric resonator and adapted to sustain a resonant oscillation pattern on said axisymmetric resonator, a first of said drive elements adapted to be driven along a first drive axis, a second of said plurality of drive elements adapted to be driven along a second drive axis, said second drive axis being offset with respect to said first drive axis, and
      at least one sense element operatively coupled with said axisymmetric resonator, said at least one sense element being adapted to detect a rotation rate;
   providing a central microprocessor operatively coupled to said axisymmetric resonator; and
   providing a computer-readable medium operatively coupled with said central microprocessor and including instructions for control of said quadrature controlled vibrating structure gyroscope, said instructions comprising:
      driving said resonator assembly along said first drive axis in accordance with a first drive signal,
      driving said resonator assembly along said second drive axis in accordance with a second drive signal, measuring a rotation rate signal from said at least one sense element while said resonator assembly is driven along said first and second drive axes, inferring a quadrature signal from said rotation rate signal, and imposing a combined phase offset between said first drive signal and said second drive signal so that said quadrature signal is maintained at a desired level.

21. The method of claim 20 wherein said second drive axis is rotationally offset with respect to said first drive axis.

22. The method of claim 21, further comprising:

configuring said control system and said drive elements to sustain said oscillation pattern to include a plurality of anti-node pairs that define a plurality of reference axes when said resonator assembly is rotationally at rest, each of said plurality of anti-node pairs being diametrically opposed about said central axis, each of said plurality of reference axes passing through a corresponding one of said plurality of anti-node pairs;

arranging said first drive axis to be offset by a first rotational offset relative to a first of said plurality of reference axes, said first drive axis being other than coincident with any of said plurality of reference axes; and arranging said second drive axis to be offset by a second rotational offset relative to a second of said plurality of reference axes, said second drive axis being other than coincident with any of said plurality of reference axes, said second rotational offset being in a direction opposite from said first rotational offset.

23. The method of claim 20, further comprising operatively coupling said control system with said at least one sense element, said control system being a closed loop control system that utilizes said quadrature signal as a feedback signal.

24. The method of claim 20 further comprising configuring said control system to drive said first drive element with a first drive signal defined by $$K \sin(\omega t) + K\alpha \cos(\omega t)$$

and configuring said control system to drive said second drive element with a second drive signal defined by $$K\alpha \cos(\omega t) - K \sin(\omega t)$$

where K is an amplitude of said drive signal, $\alpha$ is a phase offset, $\omega$ is a drive frequency and t is a time parameter.

25. The method of claim 20 further comprising configuring said control system to drive said first drive element with a first drive signal defined by $$K \sin(\omega t) + K\alpha \cos(\omega t)$$

and configuring said control system to drive said second drive element with a second drive signal defined by $$K \sin(\omega t) - K\alpha \cos(\omega t)$$

where K is an amplitude of said drive signal, $\alpha$ is a phase offset, $\omega$ is a drive frequency and t is a time parameter.

* * * * *